(12) United States Patent
Anderson

(10) Patent No.: US 7,106,376 B1
(45) Date of Patent: Sep. 12, 2006

(54) METHOD AND SYSTEM FOR IMPROVING IMAGE QUALITY OF PORTRAIT IMAGES USING A FOCUS ZONE SHIFT

(75) Inventor: Eric C. Anderson, San Jose, CA (US)

(73) Assignee: FlashPoint Technology, Inc., Raleigh, NC (US)

( * ) Notice: Subject to any disclaimer, the term of this patent is extended or adjusted under 35 U.S.C. 154(b) by 619 days.

(21) Appl. No.: 09/177,251

(22) Filed: Oct. 22, 1998

(51) Int. Cl.
*H04N 5/232* (2006.01)
*G03B 13/00* (2006.01)

(52) U.S. Cl. .................. 348/345; 348/349; 348/208.12
(58) Field of Classification Search .................. 348/345
See application file for complete search history.

(56) References Cited

U.S. PATENT DOCUMENTS

| | | | | |
|---|---|---|---|---|
| 4,825,235 A | * | 4/1989 | Wakabayashi et al. ........ 396/75 |
| 4,826,301 A | * | 5/1989 | Ikemori ...................... 350/431 |
| 5,825,016 A | * | 10/1998 | Nagahata et al. ......... 250/201.8 |
| 6,067,114 A | * | 5/2000 | Omata et al. ................ 348/345 |

* cited by examiner

*Primary Examiner*—David Ometz
*Assistant Examiner*—Yogesh Aggarwal
(74) *Attorney, Agent, or Firm*—Withrow & Terranova, PLLC

(57) ABSTRACT

A method for capturing an image using an image capture device is disclosed. The image is capable of including a plurality of objects. Each of the plurality of objects is a corresponding distance from the imaging device. The image is associated with a focus zone. The method and system include determining if the image matches at least one criterion and determining whether at least one of the plurality of objects is out of focus if the image matches the at least one criterion. The method and system further include shifting the focus zone so that the at least one object is out of focus if at least one of the plurality of subjects is not out of focus.

31 Claims, 7 Drawing Sheets

METHOD AND SYSTEM FOR IMPROVING IMAGE QUALITY OF PORTRAIT IMAGES USING A FOCUS ZONE SHIFT

FIELD OF THE INVENTION

The present invention relates to imaging devices, such as digital cameras, and more particularly to a method and system for shifting the focus zone to provide improved quality of portrait images.

BACKGROUND OF THE INVENTION

Users capture a variety of images using conventional image capture devices, such as conventional cameras or conventional digital cameras. Often, the user desires different characteristics for different images being captured. Typically, the characteristics depend on the objects within the image in which the user is interested. For example, objects within a portrait image typically include a subject or subjects in the foreground and a variety of other objects in the background. When the user captures a portrait image, the user typically desires the subjects to be in focus, appearing sharply defined in the image. However, the user also typically desires the objects in the background to appear soft, or out of focus. Similarly, when a user captures an image of a moving object, the user typically desires the moving object to be in focus.

In order to allow a user to capture images having the desired qualities, conventional image capture devices, such as conventional cameras or conventional digital cameras, may have conventional hint modes. Conventional hint modes typically set the shutter speed and aperture size based on the conditions under which the image is taken. For example, hint modes may include a conventional portrait hint mode, sport mode, or twilight mode. In conventional sport mode, the shutter speed of the conventional image capture device is set to be very fast. Thus, the moving object may appear in focus. In the conventional twilight mode, the shutter speed is set much lower, to allow sufficient light for image capture. In the conventional portrait mode, the aperture is set to have a medium focus zone, to allow the subject to be in focus and the background soft. The focus zone is the range around the focus distance in which objects will appear sharp and in focus. The focus distance is distance from the image capture device which is most sharply in focus. The focus zone is inversely proportional to the aperture size. In addition, some conventional image capture devices may be set to automatically select a hint mode based on an analysis of the image data which indicates the conditions under which the image is captured.

Although conventional image capture devices allow some improvement in image quality, some images may still not have the desired qualities. This is particularly true of portrait images. Often, the subjects in the foreground of a portrait image are relatively close to other objects that are in the background. As a result, the focus zone encompasses both the subjects in the foreground and the other objects in the background. Both the foreground and the background will be in focus, appearing sharply defined in the portrait image. The portrait image, therefore, has undesirable characteristics and relatively poor quality.

Accordingly, what is needed is a system and method for improving portrait image quality, particularly for images in which objects in the background and objects in the foreground are relatively close. The present invention addresses such a need.

SUMMARY OF THE INVENTION

The present invention provides a method and system for capturing an image using an image capture device. The image is capable of including a plurality of objects. Each of the plurality of objects is a corresponding distance from the imaging device. The image is associated with a focus zone. The method and system comprise determining if the image matches at least one criterion and determining whether at least one of the plurality of objects is out of focus if the image matches the at least one criterion. The method and system further comprise shifting the focus zone so that the at least one object is out of focus if at least one of the plurality of subjects is not out of focus.

According to the system and method disclosed herein, the present invention allows a user to capture a portrait image in which the subject is in focus, while the background is not in focus, thereby improving image quality.

DETAILED DESCRIPTION OF THE INVENTION

The present invention relates to an improvement in imaging devices, including digital cameras. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. For example, any image capture device, particularly a portable device, which displays images, icons, and/or other items could incorporate the features described hereinbelow and that device would be within the spirit and scope of the present invention. Moreover, the present invention is also consistent with other image capture devices, such as cameras or video cameras.

Thus, the present invention is not intended to be limited to the embodiment shown, but is to be accorded the widest scope consistent with the principles and features described herein.

Figure 1:
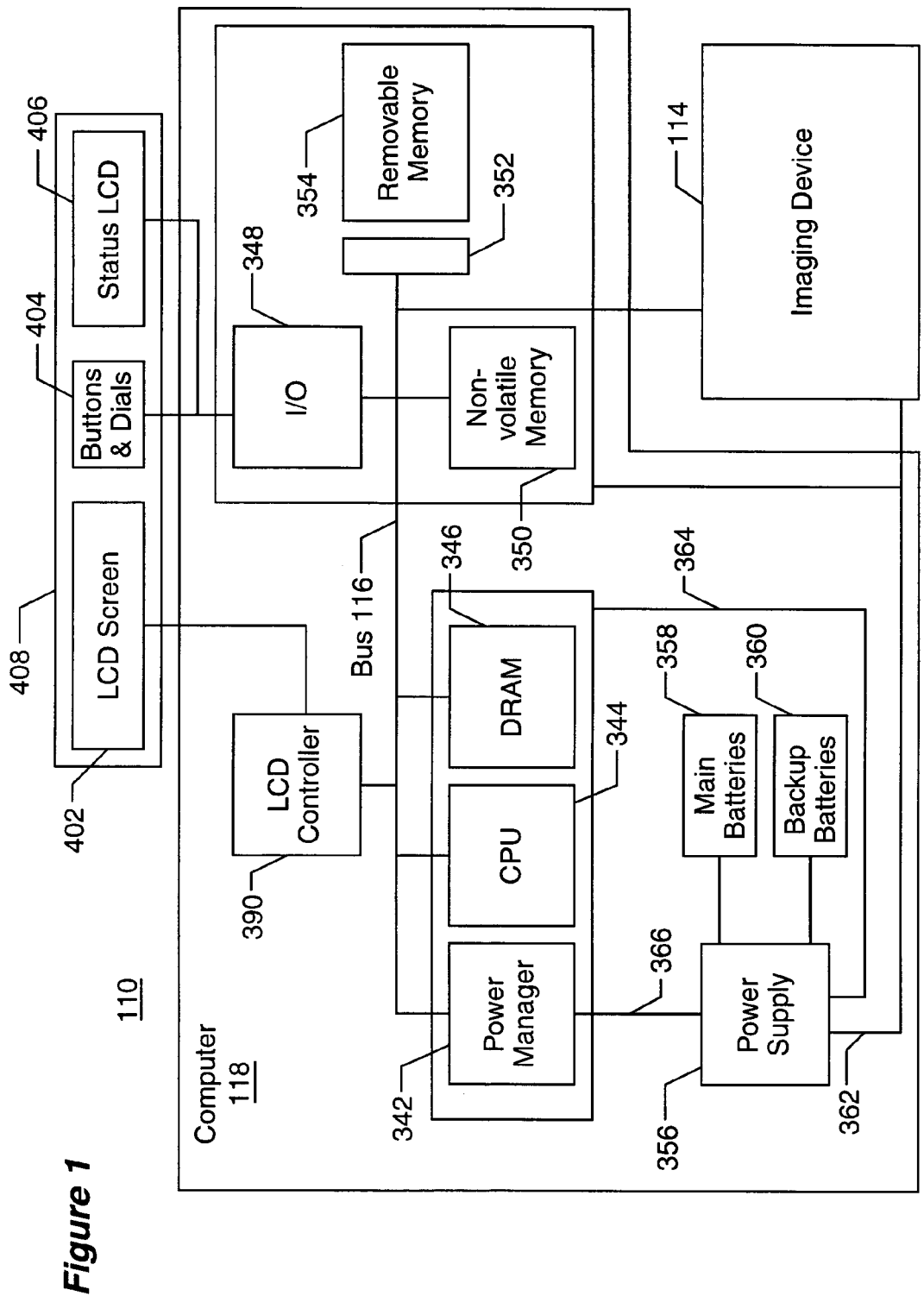
FIG. 1 is a block diagram of one preferred embodiment of a digital camera for use in accordance with the present invention.

Referring now to FIG. 1, a block diagram of one preferred embodiment of a digital camera 110 is shown for use in accordance with the present invention. Camera 110 preferably comprises an imaging device 114, a system bus 116 and a computer 118. Imaging device 114 includes an image sensor, such as a charged coupled device (CCD) or a CMOS sensor, for generating a set of raw image data representing a captured image. In a preferred embodiment, system bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352 that connect an optional removable memory 354 to system bus 116.

CPU 344 may include a conventional microprocessor device for controlling the operation of camera 110. In the preferred embodiment, CPU 344 is capable of concurrently running multiple software routines to control the various processes of camera 110 within a multithreaded environment. For example, images may be captured at the same time that previously captured images are processed in the background to effectively increase the capture rate of the camera. In a preferred embodiment, CPU 344 runs an operating system that includes a menu-driven GUI and provides image processing through software, rather than hardware. An example of such software is the Digita™ Operating Environment by FlashPoint Technology of San Jose, Calif. Although CPU 344 is preferably a microprocessor, one or more DSP's (digital signal processor) or ASIC's (Application Specific Integrated Circuit) could also be used.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, such a flash disk, readily removable and replaceable by a camera 110 user via buffers/connector 352.

Power supply 356 supplies operating power to the various components of camera 110. Power manager 342 communicates via line 366 with power supply 356 and coordinates power management operations for camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Dynamic Random-Access-Memory (DRAM) 346 is a contiguous block of dynamic memory that may be selectively allocated for various storage functions. DRAM 346 stores both raw and compressed image data and is also used by CPU 344 while executing the software routines used within computer 118. The raw image data received from imaging device 114 is temporarily stored in several input buffers (not shown) within DRAM 346. Once the raw image data is processed, it is stored in a frame buffer (not shown) for display on the LCD screen 402. In a preferred embodiment, the input buffers and the frame buffer are split into two ping-pong buffers to improve the display speed of the digital camera and to prevent the tearing of the image in the display 402. After processed image data has been stored in DRAM 346, LCD controller 390 transfers the image data to LCD screen 402 for display.

Figure 2A:
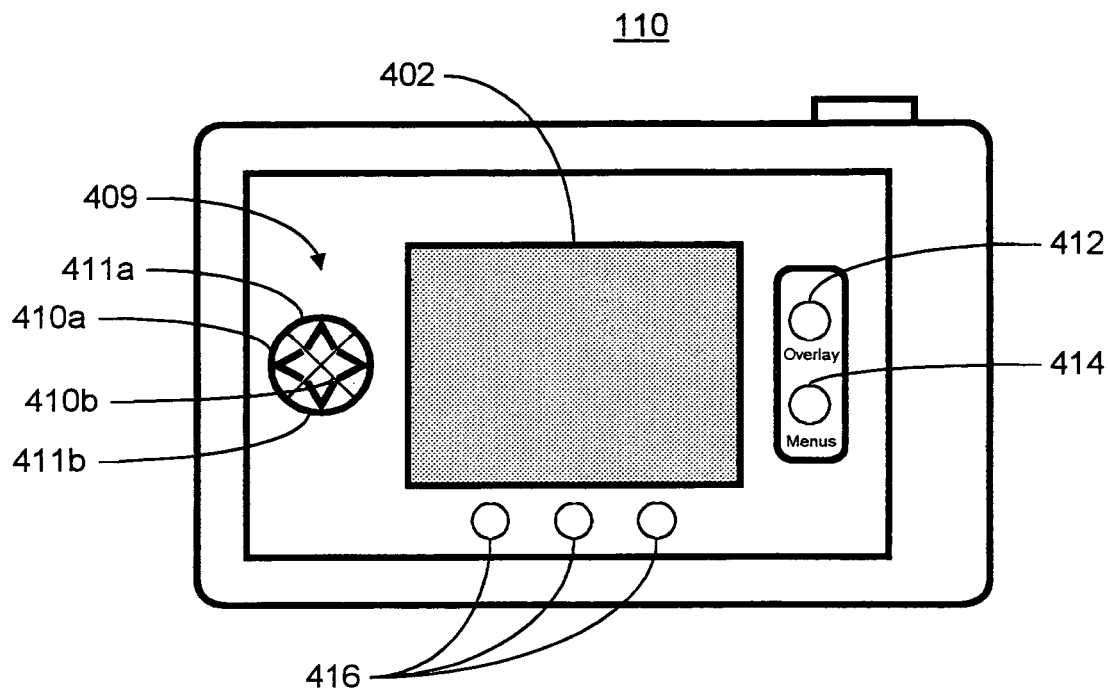
FIG. 2A is back view of the digital camera for use in accordance with the present invention.
Figure 2B:
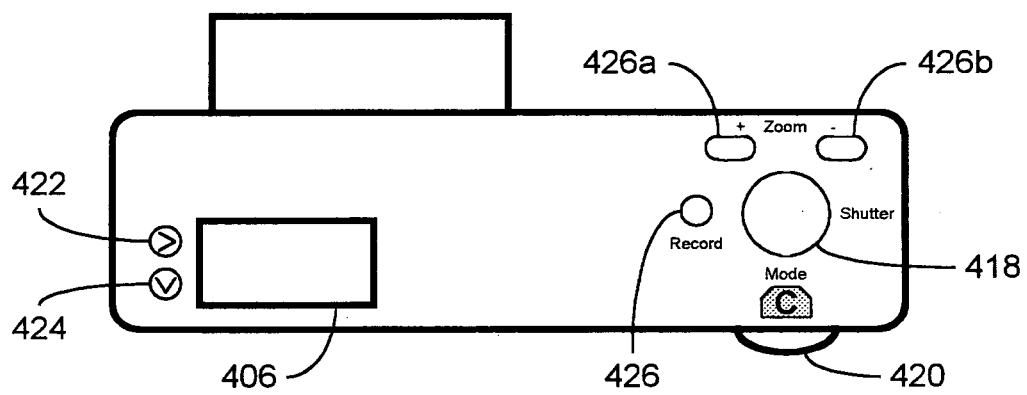
FIG. 2B is a top view of the camera for use in accordance with the present invention.

FIGS. 2A and 2B are diagrams depicting exemplary hardware components of the camera's user interface 408. FIG. 2A is back view of the camera 110 showing the LCD screen 402, a four-way navigation control button 409 having directional arrows 410a, 410b, 411a and 411b, an overlay button 412, a menu button 414, and a set of programmable soft keys 416. FIG. 2B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

The camera operates in at least two modes, capture mode for capturing images, and play mode for playing back the captured images on the LCD screen 402. To take a picture, the camera must be placed into capture mode. If the LCD screen 402 is activated, then the camera aids the user in preparing to capture an image by displaying a "live view" of the object viewed through the camera lens on the LCD screen 402 as a successive series of real-time frames. If the LCD screen 402 is not activated, then the user may capture an image using a conventional optical viewfinder (not shown).

The rate at which live view frames are processed and displayed on the LCD screen 402 depends on the hardware and software configuration of the camera, but is typically anywhere from 7 to 30 fps. In a preferred embodiment, the process responsible for generating this sequence of frames is a live view generation process, which is stored in non-volatile memory 350 and executed on CPU 344. However, the live view process can also be implemented using hardware.

During the execution of live view generation, frames of raw image data are sequentially captured by the imaging device 114 at a reduced resolution suitable for LCD screen 402, and the frames of raw image data are stored in the DRAM 346. The live view generation process then performs gamma correction and color conversion on the raw CCD data to convert the data into either a RGB or YCC color format which is compatible with the LCD screen 402. (RGB is an abbreviation for Red, Green, Blue, and YCC is an abbreviation for Luminance, Chrominance-red and Chrominance-blue). The raw image data is also processed for extracting exposure, focus, and white balance settings. After converting each frame of data to YCC (typically YCC 2:2:2 format), the YCC image data is transferred to the LCD screen 402 for display.

Although the resolution of the LCD screen 402 may vary, the LCD screen resolution is usually much less than the resolution of the image data that is produced by imaging device 114 when the user captures an image at full resolution. Typically, the resolution of LCD is the video resolution of a full resolution image. Since the LCD screen 402 is capable of only displaying images at ¼ resolution, the images generated during the live view process are also at ¼ resolution.

The live view frames generated during live view generation are displayed until the user decides to take a picture. When the user presses the shutter button to capture an image, the imaged data is captured at a resolution set by user, transformed into YCC 4:2:2 color space, compressed (e.g. JPEG), and stored as an image file. Live view then resumes to allow the capture of another image. The user may then continue to capture images or switch the camera 110 to play mode to playback and view the previously captured images on the LCD screen 402. In play mode, the user may also hear any recorded sound associated with a displayed image.

The present invention provides a method and system for capturing an image using an image capture device. The image is capable of including a plurality of objects. Each of the plurality of objects is a corresponding distance from the imaging device. The image is associated with a focus zone. The method and system comprise determining if the image matches at least one criterion and determining whether at least one of the plurality of objects is out of focus if the image matches the at least one criterion. The method and system further comprise shifting the focus zone so that the at least one object is out of focus if at least one of the plurality of subjects is not out of focus.

The present invention will be described in terms of a digital camera used to capture a portrait image. However, one of ordinary skill in the art will readily recognize that this method and system will operate effectively for other types of image capture devices. In addition, one of ordinary skill in the art will also recognize that the present invention will operate effectively for other types of images, particularly images having desirable characteristics which are similar to the desirable characteristics for portrait images.

Figure 3A:
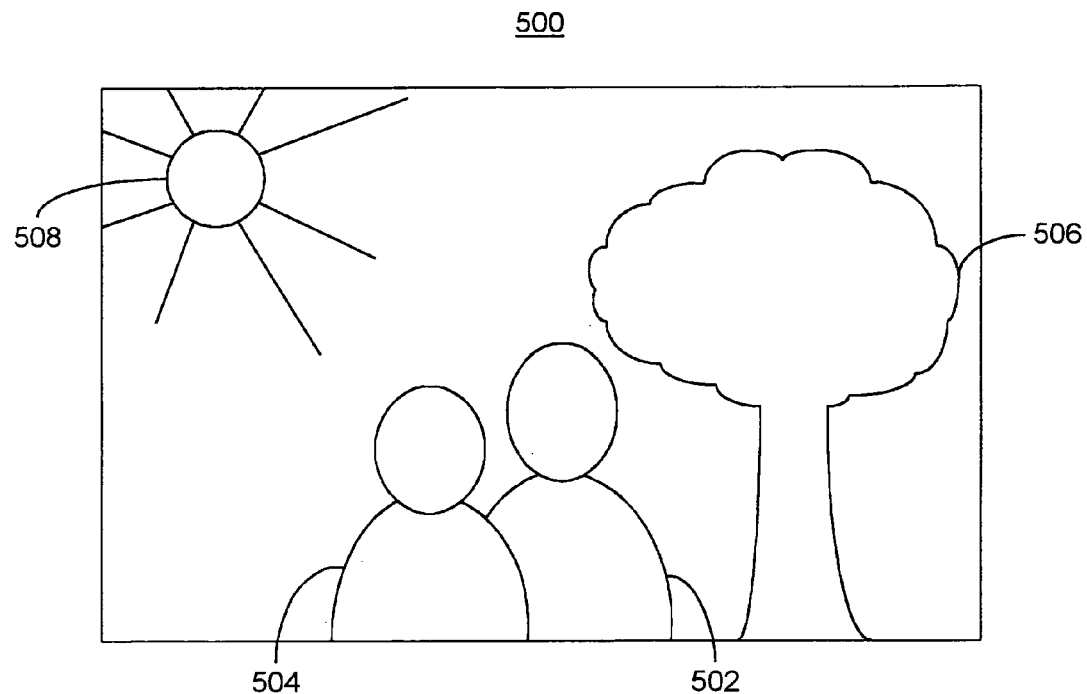
FIG. 3A depicts a portrait image which the present invention may be used in capturing.

To more particularly illustrate the method and system in accordance with the present invention, refer now to FIG. 3A depicting an image 500 which the present invention may be used to capture. The image 500 includes a variety of objects 502, 504, 506, and 508. The user is interested in ensuring that objects 502 and 504, which are close to the camera 110, are in focus. Thus, the objects 502 and 504 should appear sharply defined in the image 500. However, the user also desires more distant objects 506 and 508 to be slightly out of focus. This is known as a soft focus.

Figure 3B:
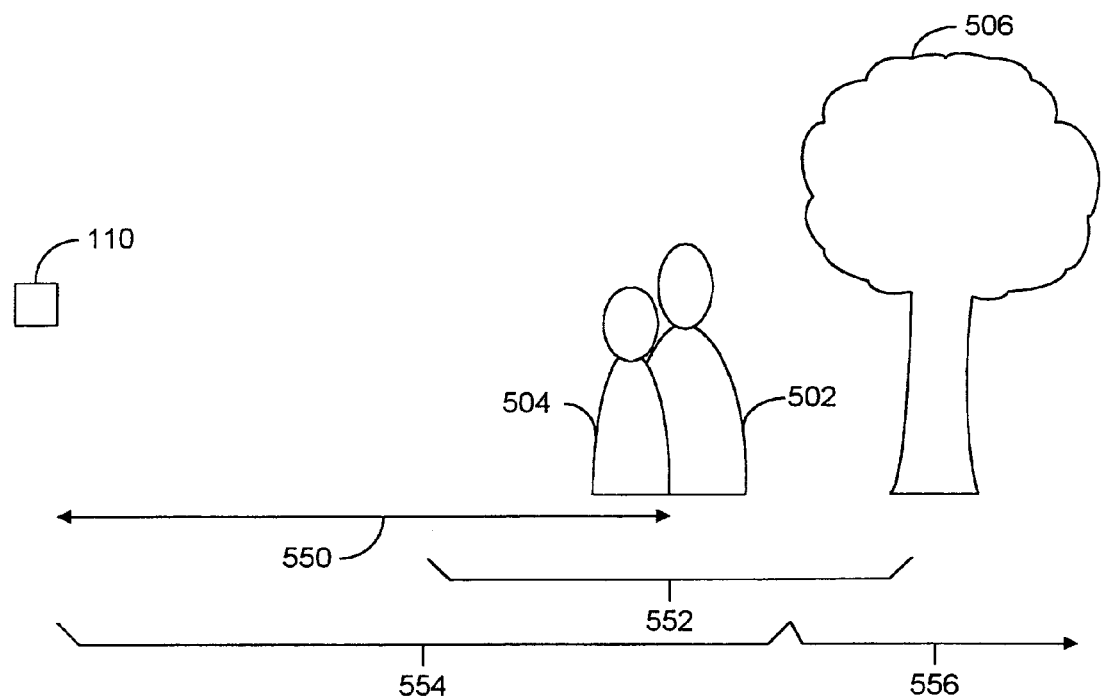
FIG. 3B depicts a side view of the scene captured in the image.

FIG. 3B depicts a side view of the scene captured in the image 500 and the digital camera 110. The objects 502 and 504 are relatively close to the camera 110. The close objects are considered to be in the foreground 554 of the image. The object 506 is farther from the camera 110. The object 508 is very far from the camera 110 and, therefore, not depicted in FIG. 3B. The objects 506 and 508 are considered to be in the background 556 of the image 500. Certain initial settings of the camera 110 are also indicated. The shutter (not shown) speed, focus distance 550, aperture (not shown), and, therefore, focus zone 552 are set. The focus distance 550 is distance from the image capture device which is most sharply in focus. The focus zone 552 is the range around the focus distance 550 in which objects will appear sharp and in focus. The range of the focus zone 552 may be limited by the conditions that the image 500 is taken under, such as the amount of light. Even when the aperture is set to obtain the smallest focus zone 552 which can be used, the focus zone 552 may include both the objects 502 and 504 and the object 506 which is farther from the camera 110. Not only the objects 502 and 504 but also the object 506 will appear in focus in the image 500 if the present invention is not utilized.

Figure 4A:
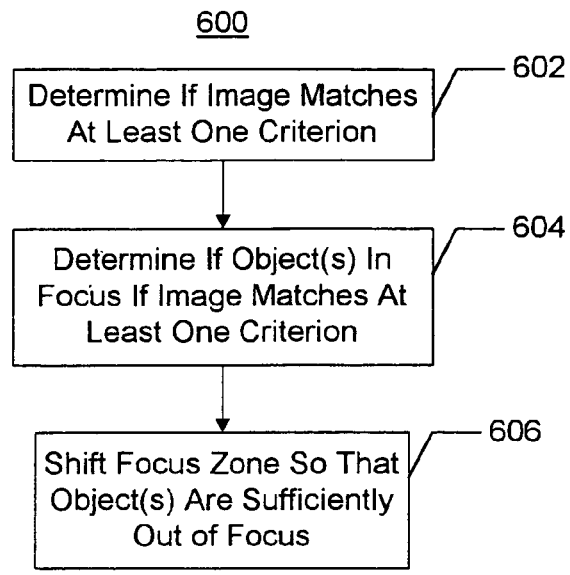
FIG. 4A is a flow chart depicting a method for improving image quality in accordance with the present invention.

FIG. 4A is a flow chart depicting a method 600 in accordance with the present invention for improving the quality of the image 500 being captured. The method 600 may be accessed when the user turns the camera to a particular hint mode, such as a special portrait mode, and depresses the shutter 418. The method 600 can be automatically accessed by the camera 110 based upon the characteristics of the image 500 when the camera is in another hint mode.

It is first determined if the image 500 matches at least one criterion, via step 602. Preferably, the criteria include an object, such as the objects 502 and 504, being close to the camera 110. For example, in one embodiment, a object 502 or 504 is considered close to the camera 110 if it is within two to three feet of the camera 110. This close region is considered to be the foreground 554 of the image 500. Thus, the distance away from the camera 110 which is considered to be the foreground 554 may be set. The remaining portion of the image may be considered the background 556. In a preferred embodiment, the criteria also include ensuring that the close object is substantially centered within the image and occupies a particular portion of the image. Thus, a small object (not shown) or an object (not shown) existing primarily near the edge of the image 500 may not fit within the criteria. In one embodiment, the close objects 502 and 504 should include at least twenty percent of the area of the image 500 to match the criteria.

If the image 500 is determined to match the criteria in step 602, it is determined if certain objects are in focus, via step 604. In a preferred embodiment, it is determined if objects 506 and 508 in the background 556 are in focus. If the objects 506 and 508 are in focus, then the focus zone 552 is shifted to ensure that the objects 506 and 508 are not in focus, via step 606. Preferably, the focus zone 552 is shifted by moving the camera lens (not shown) with respect to the remainder of the camera 110. This shortens the focus distance 550. In a preferred embodiment, step 606 is only performed only if the focus zone 552 can be shifted sufficiently to ensure that the objects 506 and 508 in the background are not in focus. In a preferred embodiment, the amount the zone 552 is shifted is greater than an amount required to make the nearest object 506 in the background 556 to be just outside the focus zone 552. This is because the amount of soft focus, or fuzziness of the objects 506 and 508 increases with increasing distance from the focus zone 552. The exact amount that the focus zone 552 is shifted, therefore, depends upon the criteria set for the desired amount of soft focus. The desired amount of soft focus may depend upon the manufacturer of the camera 110 or the user of the camera 110. Once the method 600 is completed, the image 500 is captured.

Figure 4B:
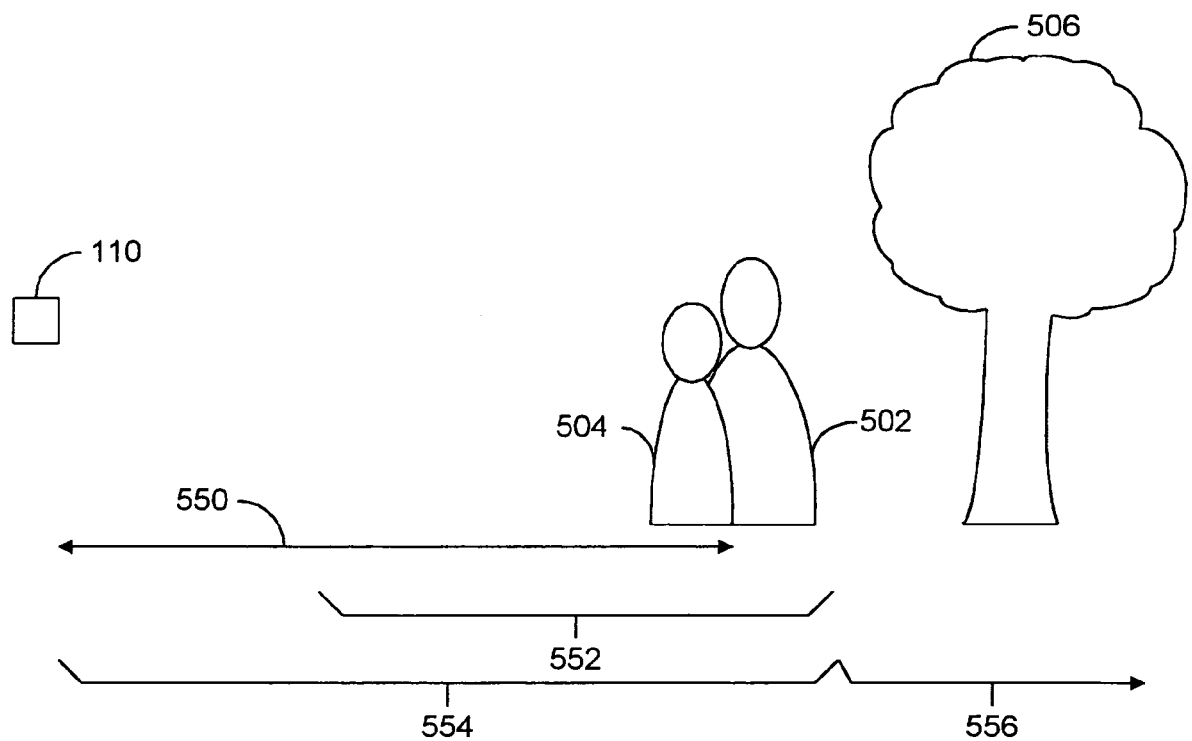
FIG. 4B depicts a side view of the scene captured after the focus shift in accordance with the present invention.

FIG. 4B depicts a side view of the scene captured in the image 500 and the digital camera 110 after the method 600 has shifted the focus zone 552. The close objects 502 and 504 in the foreground 554 of the image remain in the focus zone 552. Thus, the objects 502 and 504 remain in sharp focus. The focus zone 552 has been shifted so that the object 506 is outside of the focus zone 552. The object 508 (not shown in FIG. 4B) is also well outside of the focus zone 552. Consequently, the objects 502 and 504 in the foreground 554 will be in focus, while the objects 506 and 508 in the background 556 will be in soft focus.

Figure 5:
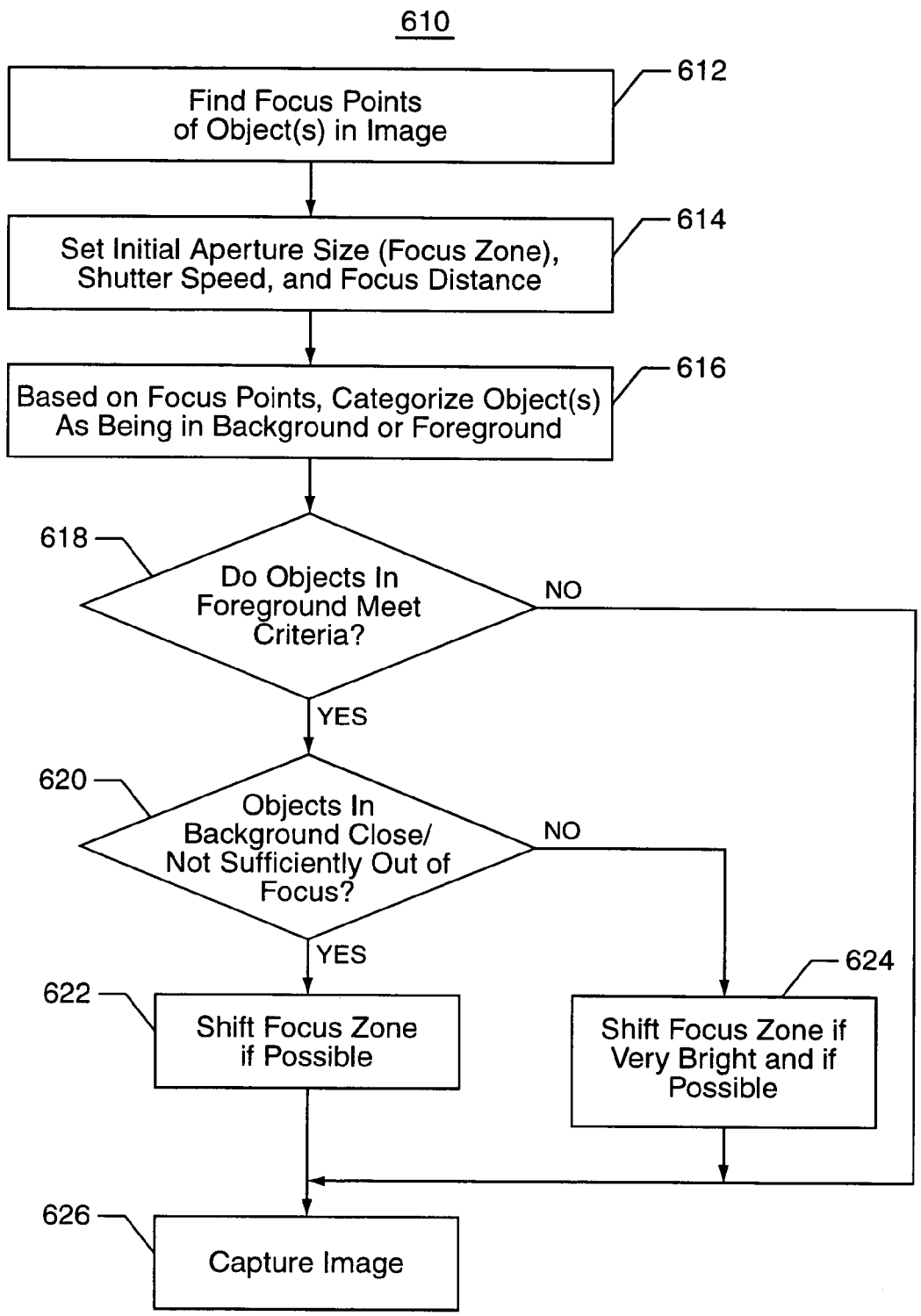
FIG. 5 is a more detailed flow chart depicting a method for improving image quality in accordance with the present invention.

FIG. 5 depicts a more detailed embodiment of a method 610 in accordance with the present invention. The method 610 may be accessed when the user turns the camera to a particular hint mode, such as a special portrait mode, and depresses the shutter 418. The method 610 can be automatically accessed by the camera 110 based upon the characteristics of the image 500 when the camera is in another hint mode.

The focus points of objects within the image 500 are determined, via step 612. The focus points are the distances at which each object 502, 504, 506, and 508 are best focused. In a preferred embodiment, this step is performed by focusing on objects starting at an infinite distance from the camera 110, and moving to objects close to the camera 110. Thus, in a preferred embodiment, the objects 508 will be focused first, then the objects 506, then object 502, and then object 504. The initial aperture size, shutter speed, and focus distance 550 are then determined, via step 614. Setting the aperture size determines the focus zone 552. Based on the focus points determined in step 612 and the criteria set for the foreground and background, each object 502, 504, 506, and 508 is categorized as being in the foreground 554 or background 556, via step 616. As discussed above, the foreground 554 may be defined as a particular distance from the camera 110, such as three feet. It is then determined if the objects 502 and 504 in the foreground match the criteria set, via step 618. In a preferred embodiment, step 618 is performed by breaking the image 500 into zones. Data in the zones is then analyzed to determine which object 502, 504, 506, and 508 the data corresponds with, the total area of the image 500 occupied by each object 502, 504, 506, and 508, and the region of the image 500 in which each object 502, 504, 506, and 508 resides. Thus, it can be determined whether the object 502, 504, 506, and 508 is near the center or the edge of the image 500.

If the objects 502 and 504 in the image 500 do not match the criteria, then the image may be captured with the current settings, via step 626. If the objects 502 and 504 match the critera, then it is then determined whether the objects 506 and 508 in the background 556 are too close, or are in focus, via step 620. In one embodiment, step 620 includes determining whether the objects 506 and 508 are within the focus zone 552 given the focus distance 550 that has been set. However, in a preferred embodiment, step 620 includes determining whether the objects 506 and 508 are within a particular distance from the focus zone 552. Thus, if the objects 506 and 508 are outside of the focus zone 552, but do not have a soft enough focus, the focus zone 552 may still be shifted.

If it is determined in step 620 that the objects 506 and 508 are not in focus, then via step 624 the focus zone 552 may be shifted only if the image 500 is very bright. Step 624 may be performed because when the image 500 is very bright, objects 506 and 508, which are well outside of the focus zone 552 and would have a sufficiently soft focus if less light were available, are actually in focus. However, step 624 is optional. If it is determined in step 620 that the objects 506 and 508 are in focus, then the focus zone is shifted, via step 622. In a preferred embodiment, step 622 is performed by calculating the amount the focus distance 550 should be offset, and shifting the focus zone 552 that amount. Then, via step 626 the image 500 may be captured.

Figure 6A:
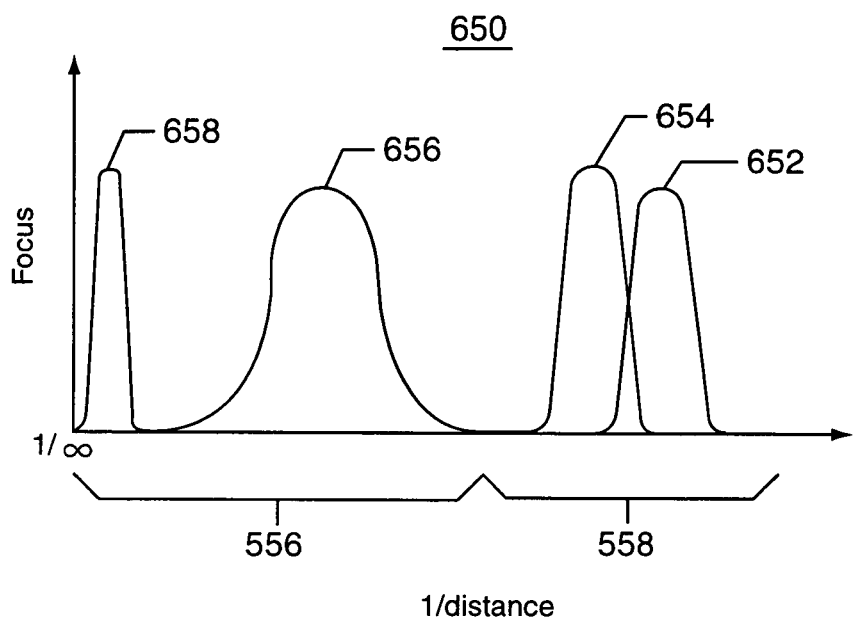
FIG. 6A is a graph depicting the location of objects with in the image.

For clarity, FIG. 6A depicts a graph of the focus versus the reciprocal of the distance from the camera 110 for each object 502, 504, 506, and 508. The plot 652 is the focus versus the reciprocal of the distance from the camera 110 for the object 502. The plot 654 is the focus versus the reciprocal of the distance from the camera 110 for the object 504. The plot 656 is the focus versus the reciprocal of the distance from the camera 110 for the object 506. The distances at which the peaks in the plot 652, 654, 656, and 658 occurs corresponds to the focus points for the objects 502, 504, 506, and 508, respectively. Thus, the objects 502 and 504 are in the foreground 556, while the objects 506 and 508 are in the background 558 of the image 500.

Figure 6B:
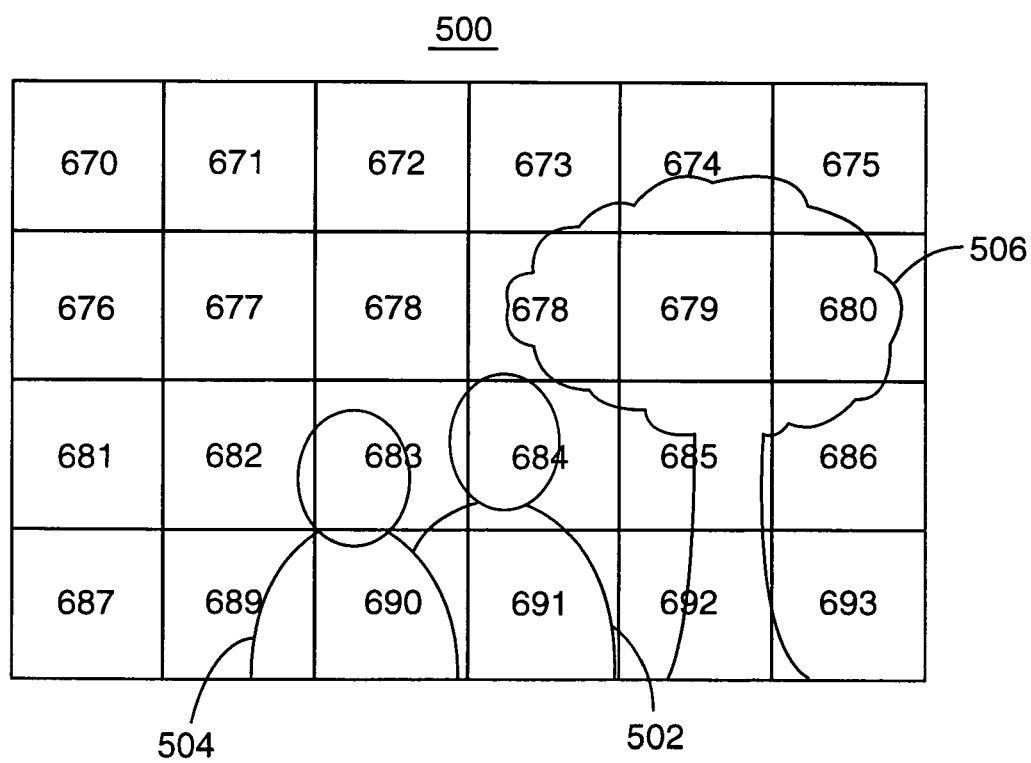
FIG. 6B is a block diagram of the image broken into a number of zones for data analysis in accordance with the present invention.

FIG. 6B depicts the image 500 which has been broken into a number of zones 670 through 693. Although twenty-four zones 670 through 693 are shown, nothing prevents the use of another number of zones. Using data in each zone, a number of zones and an amount of each zone that a particular object 502, 504, 506, or 508 occupies can be determined. It can also be determined if an object, such as the objects 502 or 504, lies near the center of the image 500. In one embodiment, this can be accomplished by analyzing the data in zones 78, 79, 84, and 85. Similarly, it can be determined if an object 502, 504, 506, or 508 lies primarily near an edge by analyzing data for zones 670 through 676, 681 through 682, and 687 through 693, which are on the edge of the image 500.

Figure 7:
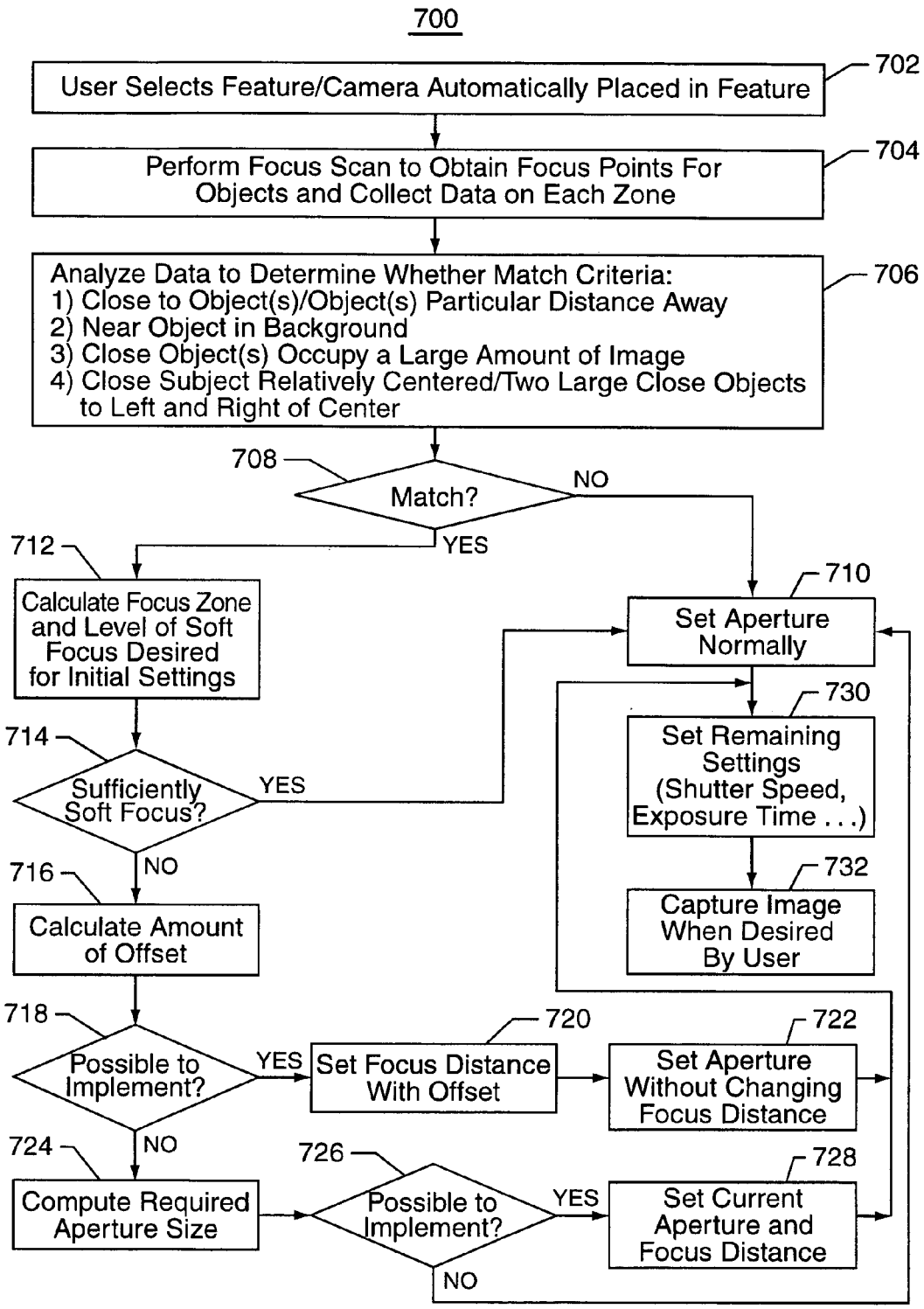
FIG. 7 is a more detailed flow chart of a preferred embodiment of a method in accordance with the present invention.

FIG. 7 depicts a more detailed flow chart of a preferred method 700 in accordance with the present invention. The feature that will allow the focus zone 552 to be shifted is selected by the user or automatically by the camera, via step 702. The camera 110 then performs a focus scan to obtain the focus points for the objects 502, 504, 506, and 508 within the image 500, via step 704. Preferably, this scan commences at an infinite distance from the camera 110 and completes very close to the camera 110. Also in step 704, data for all objects 502, 504, 506, and 508 is collected for each zone 670 through 693 during the focus scan. The graph depicted in FIG. 6A could be generated from the data collected in step 704.

The data for the zones 670 through 693 is then analyzed to determine if the image 500 matches a set of criteria, via step 706. In a preferred embodiment, the analysis in step 706 includes categorizing objects 502, 504, 506, and 508 as being in the foreground 556 or the background 558. Also in a preferred embodiment, the foreground is defined a set distance from the camera. In the preferred embodiment, there are several criteria. The first criterion is that the image 500 include at least one object, such as objects 502 and 504, which is close to the camera 110. Preferably, close is defined as a particular distance from the camera 110, such as three feet. A second criterion is that at least one object within the background 558 be near the object or objects 502 and 504 in the foreground 554. In a preferred embodiment, this second criterion is that the focus point of at least one object within the background 556 be within a certain distance from the focus point of an object 502 or 504 in the foreground 554. A third criterion is that the close object or objects occupy a large amount of the image. In one embodiment, the objects 502 and 504 should occupy at least twenty percent of the image 500. A fourth criterion is that the close objects or objects be relatively centered in the image 500.

It is then determined if a match was found in step 706, via step 708. If it is determined that a match for the criteria was not found in step 706, then via step 710 the aperture is set normally. The remaining settings, such as the exposure time and shutter speed are then set via step 730, and the image captured when the user directs the image to be captured, via step 732.

If it is determined in step 708 that a match was found, then in step 712 the focus zone and the level of soft focus desired for objects 506 and 508 in the background 556 are determined for the initial settings. The initial settings include the aperture size and shutter speed settings. It is then determined if the current focus for the objects 506 and 508 in the background 556 are sufficient, via step 714. In one embodiment, step 714 includes determining if the focus points for objects 506 and 508 in the background are greater than a particular distance of the focus zone 552.

If it is determined in step 714 that the soft focus of objects 506 and 508 in the background is sufficient, then the aperture is set normally, via step 710. Steps 730 and 732 will then follow, allowing a user to capture an image. If it is determined in step 714 that the soft focus is not sufficient, then via step 716 the amount the focus distance 550 should be offset is calculated. The offset preferably shortens the focus distance 550 sufficiently to allow the objects 506 and 508 in the background 556 to be at least a particular distance from the focus zone 552.

It is then determined if the focus distance 550 can be offset the calculated amount, via step 718. If it is determined that the focus distance 550 can be offset the calculated amount then the focus distance 550 is offset that amount, via step 720. The aperture is then set without substantially changing the focus distance 550, via step 722. The remaining settings are then set, via step 730, and the image captured in step 732.

If it is determined that the focus distance 550 cannot be offset the calculated amount, then via step 724 the aperture size required to sufficiently shorten the focus zone 552 with the current focus distance is determined. In one embodiment, the required aperture size is one which will set the focus zone 552 a particular distance from the focus points of the objects 506 and 508 in the background 556. It is then determined if the aperture can be set to the required size, via step 726. If the aperture can be set to the required size, then the aperture and initial focus distance are set, via step 728. The remaining settings are then set and the image 500 captured in steps 730 and 732, respectively. Note that in step 720 the shutter speed may be set based upon the aperture size that has been set. Consequently, changing the aperture size from the initial settings should not substantially degrade image quality. If, however, it is determined that the correct aperture cannot be set, then the normal aperture setting is used, via step 710. The remaining settings are then set and the image 500 captures in steps 730 and 732, respectively. Although not shown, the method 700 could loop back through steps 712 through 728 to determine the optimal combination of focus distance 550 and focus zone 552 to provide the closest focusing of objects 502 and 504 in the background to the soft focusing that is desired.

A method and system has been disclosed for improving the quality of portrait images by shifting the focus zone. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claim

What is claimed is:

1. A method for capturing an image using an image capture device, the image capable of including a plurality of objects, each of the plurality of objects being a corresponding distance from the imaging device, the image being associated with a focus zone, method comprising the steps of:
   (a) determining if the image matches at least one criteria;
   (b) determining whether at least one of the plurality of objects is out of focus if the image matches the at least one criteria;
   (c) determining whether the focus zone can be shifted so that the at least one object is out of focus if the at least one object is not out of focus; and
   (d) shifting the focus zone so that the at least one object is out of focus if at least one of the plurality of subjects is not out of focus and if it is determined that the focus zone can be shifted so that the at least one object is out of focus;
   (e) setting an aperture size without shifting the focus zone after the focus zone has been shifted if it is determined that the focus zone can be shifted so that the at least one object is out of focus; and
   (f) adjusting the aperture size to shorten the focus zone if it is determined that shifting the focus zone alone is not sufficient for the at least one object to be out of focus.

2. The method of claim 1 wherein the step of determining if the image matches the at least one criteria (a) further includes the step of:
   (a1) determining the corresponding distance for each of the plurality of objects.

3. The method of claim 2 wherein the step of determining if the image matches the at least one criteria (a) further includes the step of:
   (a2) categorizing the plurality of objects as being located in a foreground or a background based on the corresponding distance, the image matching one of the at least one criteria if a first object in the foreground has a first corresponding distance and a second object in the background has a second corresponding distance.

4. The method of claim 1 further wherein the step of determining if the image matches the at least one criteria (a) further includes the step of:
   (a1) separating the image into a plurality of zones;
   (a2) analyzing the image in each of the plurality of zones to determine if the image matches the at least one criteria.

5. The method of claim 4 wherein the at least one criteria includes the size of a particular object of the plurality of objects and wherein the step of analyzing the image (a2) further includes the step of:
   (a2i) determining the amount of each zone and a number of zones which the particular object occupies.

6. The method of claim 1 wherein the image includes a center and at least one criterion includes a location of a particular object of the plurality objects being in proximity to the center of the image.

7. The method of claim 1 wherein the step of shifting the focus zone (d) further includes the step of:
   (d1) shifting the focus zone so that the at least one object is outside of the focus zone if the focus zone can be shifted so that the at least one object is outside of the focus zone.

8. A method for allowing an image having a center to be captured by an imaging device, the image capable of including a plurality of objects, each of the plurality of objects being a corresponding distance from the imaging device, the method comprising the steps of:
   (a) determining if the image matches a plurality of criteria, the step of determining if the image matches the plurality criteria further including the steps of:
      (a1) determining the corresponding distance for each of the plurality of objects;
      (a2) categorizing the plurality of objects as being located in a foreground or a background based on the corresponding distance, the image matching a first criteria of the plurality of criteria if a first object in foreground has a first corresponding distance and a second object in the background has a second corresponding distance;
      (a3) separating the image into a plurality of zones;
      (a4) analyzing the image in each of the plurality of zones to determine an amount of the image which each of the plurality of objects occupies, the image matching a second criteria of the plurality of criteria if the first object occupies a particular amount of the image;
      (a5) analyzing the image in each of the plurality of zones to determine if the first object in the foreground is in proximity to the center of the image, the image matching a third criteria of the plurality of criteria if the first object is in proximity to the center of the image;
   (b) determining whether the second object is out of focus if the image matches at least one criteria;
   (c) determining a focus zone;
   (d) determining whether the focus zone can be shifted so that that the at least one object is out of focus if the at least one object is not out of focus; and
   (e) shifting the focus zone so that the at least one object is out of focus if at least one of the plurality of subjects is not out of focus and if the focus zone can be shifted so that the at least one object is out of focus;
   (f) setting an aperture size without shifting the focus zone after the focus zone has been shifted if it is determined that the focus zone can be shifted so that the at least one object is out of focus; and
   (g) adjusting the aperture size to shorten the focus zone if it is determined that shifting the focus zone alone is not sufficient for the at least one object to be out of focus.

9. An image capture device for capturing an image capable of including a plurality of objects, each of the plurality of objects being a corresponding distance from the imaging device, the image being associated with a focus zone, the image capture device comprising:
   means for determining if the image matches at least one criterion;
   means for determining whether at least one of the plurality of objects is out of focus if the image matches the at least one criteria;
   means for determining whether the focus zone can be shifted so that the at least one object is out of focus if the at least one object is not out of focus; and
   means for shifting the focus zone, the focus zone shifting means shifting the focus zone so that the at least one object is out of focus if at least one of the plurality of subjects is not out of focus if it is determined that the focus zone can be so shifted;
   means for adjusting an aperture size, the aperture size adjusting means setting the aperture size without shifting the focus zone after the focus zone has been shifted if it is determined that the focus zone can be shifted so that the at least one object is out of focus and adjusting the aperture size to shorten the focus zone if it is determined that shifting the focus zone alone is not sufficient for the at least one object to be out of focus.

10. The image capture device of claim 9 wherein means for determining if the image matches the at least one criteria further includes:
   means for determining the corresponding distance for each of the plurality of objects.

11. The image capture device of claim 10 wherein the means for determining if the image matches the at least one criteria further includes:
   means for categorizing the plurality of objects as being located in a foreground or a background based on the corresponding distance, the image matching one of the at least one criteria if a first object in the foreground has a first corresponding distance and a second object in the background has a second corresponding distance.

12. The image capture device of claim 9 further wherein the means for determining if the image matches the at least one criteria further includes:
   means for separating the image into a plurality of zones; and
   means for analyzing the image in each of the plurality of zones to determine if the image matches the at least one criteria.

13. The image capture device of claim 12 wherein the at least one criteria includes the size of a particular object of the plurality of objects and wherein the means for analyzing the image further includes:
   means for determining the amount of each zone and a number of zones which the particular object occupies.

14. The image capture device of claim 9 wherein the image includes a center and at least one criterion includes a location of a particular object of the plurality objects being in proximity to the center of the image.

15. The image capture device of claim 9 wherein the means for shifting the focus zone further includes:
   means for shifting the focus zone so that the at least one object is outside of the focus zone if the focus zone can be shifted so that the at least one object is outside of the focus zone.

16. The image capture device of claim 15 wherein the means for shifting the focus zone further includes:
   means for adjusting the shifting of the focus zone so that the focus zone can be shifted so that at least one object is outside of the focus zone if the at least one of the plurality of subjects is not out of focus.

17. The image capture device of claim 1 wherein the image capture device is a digital camera.

18. A computer-readable medium containing a program for capturing an image capable of including a plurality of objects, each of the plurality of objects being a corresponding distance from the imaging device, the image being associated with a focus zone, program including instructions for:
   determining if the image matches at least one criterion;
   determining whether at least one of the plurality of objects is out of focus if the image matches the at least one criterion;
   determining whether the focus zone can be shifted so that that the at least one object is out of focus if the at least one object is not out of focus;
   shifting the focus zone so that the at least one object is out of focus if at least one of the plurality of subjects is not out of focus if it is determined that the focus zone can be shifted so that the at least one object is out of focus;

setting an aperture size without shifting the focus zone after the focus zone has been shifted if it is determined that the focus zone can be shifted so that the at least one object is out of focus;

adjusting the aperture size to shorten the focus zone if it is determined that shifting the focus zone alone is not sufficient for the at least one object to be out of focus.

19. The computer-readable medium of claim 18 wherein the instructions for shifting the focus zone further include instructions for:

shifting the focus zone so that the at least one object is outside of the focus zone if the focus zone can be shifted so that the at least one object is outside of the focus zone.

20. The computer-readable medium of claim 19 wherein the instructions for shifting the focus zone further include instructions for:

adjusting the focus zone so that the focus zone can be shifted so that at least one object is outside of the focus zone if the focus zone can be shifted so that the at least one object is outside of the focus zone.

21. A computer-readable medium containing a program for capturing an image having a center to be captured by an imaging device, the image capable of including a plurality of objects, each of the plurality of objects being a corresponding distance from the imaging device, the program containing instructions for:

determining if the image matches a plurality of criteria, the instructions for determining if the image matches the plurality criteria further including instruction for:

determining the corresponding distance for each of the plurality of objects;

categorizing the plurality of objects as being located in a foreground or a background based on the corresponding distance, the image matching a first criterion of the plurality of criteria if a first object in foreground has a first corresponding distance and a second object in the background has a second corresponding distance;

separating the image into a plurality of zones;

analyzing the image in each of the plurality of zones to determine an amount of the image which each of the plurality of objects occupies, the image matching a second criterion of the plurality of criteria if the first object occupies a particular amount of the image;

analyzing the image in each of the plurality of zones to determine if the first object in the foreground is in proximity to the center of the image, the image matching a third criterion of the plurality of criteria if the first object is in proximity to the center of the image;

determining whether the second object is out of focus if the image matches at least one criterion;

determining a focus zone;

determining whether the focus zone can be shifted so that that the at least one object is out of focus if the at least one object is not out of focus; and shifting the focus zone so that the at least one object is out of focus if at least one of the plurality of subjects is not out of focus and if the focus zone can be shifted so that the at least one object is out of focus;

setting an aperture size without shifting the focus zone after the focus zone has been shifted if it is determined that the focus zone can be shifted so that the at least one object is out of focus;

adjusting the aperture size to shorten the focus zone if it is determined that shifting the focus zone alone is not sufficient for the at least one object to be out of focus.

22. The method of claim 1 further comprising the step of:

(g) setting the focus zone location based on the aperture size if the aperture size has been adjusted to shorten the focus zone if it is determined that the focus zone cannot be shifted so that the at least one object is out of focus.

23. The method of claim 8 further comprising the step of:

(h) setting the focus zone location based on the aperture size if the aperture size has been adjusted to shorten the focus zone if it is determined that the focus zone cannot be shifted so that the at least one object is out of focus.

24. The image capture device of claim 9 wherein the focus zone shifting means further set the focus zone location based on the aperture size if the aperture has been adjusted to shorten the focus zone if it is determined that the focus zone cannot be shifted so that the at least one object is out of focus.

25. The computer-readable medium of claim 18 wherein the program further includes instructions for:

setting the focus zone location based on the aperture size if the aperture size has been adjusted to shorten the focus zone if it is determined that the focus zone cannot be shifted so that the at least one object is out of focus.

26. The computer-readable medium of claim 21 wherein the program further includes instructions for:

setting the focus zone location based on the aperture size if the aperture size has been adjusted to shorten the focus zone if it is determined that the focus zone cannot be shifted so that the at least one object is out of focus.

27. The method of claim 1 wherein the aperture-adjusting step (f) further includes the step of:

(f1) adjusting the aperture size to shorten the focus zone only if it is determined that shifting the focus zone alone is not sufficient for the at least one object to be out of focus.

28. The method of claim 8 wherein the aperture-adjusting step (g) further includes the step of:

(g1) adjusting the aperture size to shorten the focus zone only if it is determined that shifting the focus zone alone is not sufficient for the at least one object to be out of focus.

29. The image capture device of claim 9 wherein the aperture adjusting means further adjust the aperture size to shorten the focus zone only if it is determined that shifting the focus zone alone is not sufficient for the at least one object to be out of focus.

30. The computer-readable medium of claim 18 wherein the aperture-adjusting instructions further include instructions for:

adjusting the aperture size to shorten the focus zone only if it is determined that shifting the focus zone alone is not sufficient for the at least one object to be out of focus.

31. The computer-readable medium of claim 21 wherein the aperture-adjusting instructions further include instructions for:

adjusting the aperture size to shorten the focus zone only if it is determined that shifting the focus zone alone is not sufficient for the at least one object to be out of focus.

* * * * *